United States Patent
Qian

(10) Patent No.: US 9,916,182 B2
(45) Date of Patent: Mar. 13, 2018

(54) METHOD AND APPARATUS FOR ALLOCATING STREAM PROCESSING UNIT

(71) Applicant: Huawei Technologies Co., Ltd., Shenzhen, Guangdong (CN)

(72) Inventor: Jianfeng Qian, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 648 days.

(21) Appl. No.: 14/331,506

(22) Filed: Jul. 15, 2014

(65) Prior Publication Data

US 2015/0026347 A1    Jan. 22, 2015

(30) Foreign Application Priority Data

Jul. 17, 2013    (CN) .......................... 2013 1 0302816

(51) Int. Cl.
    *G06F 9/50*       (2006.01)
    *G06F 11/34*      (2006.01)

(52) U.S. Cl.
    CPC ............ *G06F 9/5027* (2013.01); *G06F 9/505* (2013.01); *G06F 9/5044* (2013.01);
    (Continued)

(58) Field of Classification Search
    CPC . G06F 9/00; G06F 9/50; G06F 9/5027; G06F 9/5038–9/505; G06F 13/00;
    (Continued)

(56) References Cited

U.S. PATENT DOCUMENTS 5,784,630 A * 7/1998 Saito ................... G06F 9/30087
                                                        709/213
8,284,205 B2 * 10/2012 Miller .................... G06F 1/3203
                                                        345/501
(Continued)

FOREIGN PATENT DOCUMENTS

CN        101022649 A      8/2007
CN        101089819 A     12/2007
              (Continued)

OTHER PUBLICATIONS

Trader—How to calculate CPU utilization—Jul. 13, 2004.*
(Continued)

*Primary Examiner* — Brian J Gillis
*Assistant Examiner* — Boris Grijalva Lobos

(57) ABSTRACT

The present invention discloses a method and an apparatus for allocating a stream processing unit, and pertains to the field of communications technologies. The method includes: obtaining a parallelism degree and a resource usage rate of a stream processing component on each computing node, and determining the number of stream processing units according to the parallelism degree; generating a stream processing unit to be allocated, and determining a resource usage rate of the stream processing component as a resource usage rate of a corresponding stream processing unit; and allocating, according to a processing capability of the computing node on which the stream processing component is located and a resource usage rate of an allocated stream processing unit, the stream processing unit to be allocated to a corresponding computing node. According to the present invention, the steam data processing efficiency of a distributed stream processing system is improved.

14 Claims, 6 Drawing Sheets

(52) U.S. Cl.
CPC ...... G06F 11/3404 (2013.01); G06F 11/3433 (2013.01); *G06F 11/3466* (2013.01)

(58) Field of Classification Search
CPC .......... G06F 13/14; G06F 15/00; G06F 15/16; G06F 11/00; G06F 11/22; G06F 11/34; G06F 11/3404; G06F 11/3433; G06F 11/3466
See application file for complete search history.

(56) References Cited

U.S. PATENT DOCUMENTS

| | | | |
|---|---|---|---|
| 8,830,245 B2* | 9/2014 | Bone | G06F 9/5044 345/501 |
| 2001/0052053 A1* | 12/2001 | Nemirovsky | G06F 9/546 711/138 |
| 2007/0038595 A1* | 2/2007 | Ghosh | G06F 17/30463 |
| 2009/0027403 A1* | 1/2009 | Jung | G06F 9/505 345/505 |
| 2011/0131583 A1 | 6/2011 | Geraci | |
| 2011/0286447 A1* | 11/2011 | Liu | H04L 45/74 370/389 |
| 2012/0017218 A1 | 1/2012 | Branson et al. | |
| 2012/0198447 A1* | 8/2012 | Osogami | G06F 9/5066 718/1 |
| 2013/0031282 A1 | 1/2013 | Amini et al. | |
| 2013/0145121 A1 | 6/2013 | Fawcett | |
| 2014/0068621 A1* | 3/2014 | Sitaraman | G06F 9/505 718/102 |
| 2014/0259024 A1* | 9/2014 | Sridharan | G06F 9/485 718/106 |
| 2016/0179898 A1 | 6/2016 | Zhang et al. | |

FOREIGN PATENT DOCUMENTS

| | | |
|---|---|---|
| CN | 101217491 A | 7/2008 |
| CN | 101488098 A | 7/2009 |
| CN | 103136217 A | 6/2013 |
| EP | 2 309 388 A1 | 4/2011 |

OTHER PUBLICATIONS

Wonderhoswto—How to Find the percent given two numbers—math.wonderhowto.com—2011.*

Popyack—Rounding Error—Jun. 2000.*

Mohamed Medhat Gaber (Ed.), "Scientific Data Mining and Knowledge Discovery, Principles and Foundations", Springer, 411 pages.

* cited by examiner

METHOD AND APPARATUS FOR ALLOCATING STREAM PROCESSING UNIT

CROSS-REFERENCE TO RELATED APPLICATION

This application claims priority to Chinese Patent Application No. 201310302816.5, filed on Jul. 17, 2013, which is hereby incorporated by reference in its entirety.

TECHNICAL FIELD

The present invention relates to the field of communications technologies, and in particular, to a method and an apparatus for allocating a stream processing unit.

BACKGROUND

As a data volume of stream data that needs to be processed in a stream processing task becomes increasingly larger, a single computing node has become incapable of processing all stream data in the stream processing task. Therefore, the stream data in the stream processing task is placed separately on multiple computing nodes, and the multiple computing nodes process the stream data separately. With the development of a multi-core technology, in order to use resources of a computing node more effectively to perform efficient processing on the stream data, stream processing units capable of parallel processing are used to perform parallel processing on the stream data. Specifically, the stream processing units are allocated to each computing node, and a stream processing component on the computing node manages at least one allocated stream processing unit, thereby implementing processing on the stream data. Therefore, a proper method for allocating a stream processing unit is crucial to implementing efficient processing on the stream data.

At present, when a stream processing unit is allocated, the number of stream processing components and the number of stream processing units included in each stream processing component are determined in a stream processing task. A stream system service module allocates a stream processing unit to a stream system processing module according to a volume size of stream data flowing into the stream processing unit. For example, a stream processing task has three stream processing units, which are respectively a stream processing unit 1, a stream processing unit 2, and a stream processing unit 3, where a volume of stream data flowing into both the stream processing unit 1 and the stream processing unit 2 is 1 GB, and a volume of data in the stream processing unit 3 is 2 GB. The stream processing unit 1 and the stream processing unit 2 are allocated to a stream system processing module 1 on a computing node 1, and the stream processing unit 3 is allocated to a stream system processing module 2 on a computing node 2 according to the volume sizes of the data flowing into the stream processing units.

During research on the prior art, the inventor finds that the existing method for allocating a stream processing unit has at least the following problems:

A stream processing unit is allocated to a stream system processing module according to a volume size of stream data flowing into the stream processing unit, but a processing capability of a computing node on which the stream processing unit is located is not considered; therefore, a case is caused in which computing resourced of the computing node on which the stream processing unit is located cannot satisfy a requirement for processing a data stream allocated by the stream system service module to the stream processing unit, thereby reducing the data stream processing efficiency for a distributed stream processing system.

SUMMARY

In order to resolve the problem of the prior art, embodiments of the present invention provide a method and an apparatus for allocating a stream processing unit. The technical solutions are as follows:

According to a first aspect, a method for allocating a stream processing unit is provided, where the method includes:

obtaining a parallelism degree and a resource usage rate of each stream processing component on each computing node, where the parallelism degree is used to indicate the number of stream processing units included in a stream processing component;

determining the number of stream processing units included in any one stream processing component according to a parallelism degree of the any one stream processing component of the stream processing components;

generating at least one stream processing unit to be allocated corresponding to the stream processing components, and determining a resource usage rate of anyone stream processing component as a resource usage rate of any one stream processing unit corresponding to the any one stream processing component; and allocating, according to a processing capability of a computing node on which each stream processing component is located and a resource usage rate of each stream processing unit to be allocated, each stream processing unit to be allocated to a corresponding computing node.

With reference to the first aspect, in a first possible implementation manner of the first aspect, the obtaining a parallelism degree and a resource usage rate of each stream processing component on each computing node includes:

for any one stream processing component on any one computing node, testing an initial output rate and a maximum output rate of the any one stream processing component by using a stream testing component, and recording a resource usage rate corresponding to the any one stream processing component when the any one stream processing component is at the initial output rate and a resource usage rate corresponding to the any one stream processing component at the maximum output rate; and determining a ratio of the maximum output rate to the initial output rate of the any one stream processing component as a parallelism degree of the any one stream processing component, and determining a resource usage rate of the any one stream processing component according to the parallelism degree of the any one stream processing component.

With reference to the first aspect, in a second possible implementation manner of the first aspect, the determining the number of stream processing units included in any one stream processing component according to a parallelism degree of the any one stream processing component includes:

rounding up the parallelism degree of the any one stream processing component to obtain an up-rounded value, and using the up-rounded value as the number of stream processing units included in the any one stream processing component.

With reference to the first aspect, in a third possible implementation manner of the first aspect, the allocating, according to a processing capability of a computing node on which each stream processing component is located and a resource usage rate of each stream processing unit to be allocated, each stream processing unit to be allocated to a corresponding computing node includes:

selecting one computing node from computing nodes on which the stream processing components are located;

for the selected computing node, selecting one stream processing unit for the selected computing node from stream processing units to be allocated;

determining, according to a processing capability of the selected computing node and a resource usage rate of the selected stream processing unit, whether the selected computing node satisfies an allocation condition of the selected stream processing unit; and if the allocation condition is satisfied, allocating the selected stream processing unit to the selected computing node.

With reference to the third possible implementation manner of the first aspect, in a fourth possible implementation manner of the first aspect, the selecting one computing node from computing nodes on which the stream processing components are located includes:

determining central processing unit CPU average usage rates Cavg_usage and memory average usage rates Mavg_usage of all stream processing components according to the resource usage rate of each stream processing component on each computing node; and selecting one computing node from the computing nodes on which the stream processing components are located and determining whether Cused≥Cavg_usage*Ncpu*Ccore or Mused≥Mavg_usage*Mpc is valid, and if invalid, using the selected one computing node as the selected computing node;

where the Cused is a CPU resource used by a stream processing unit that is allocated to the selected one computing node, Ncpu is the number of CPUs of the selected one computing node, Ccore is a CPU frequency of the selected one computing node, Mused is a memory resource used by the stream processing unit that is allocated to the selected one computing node, and Mpc is the total amount of memory of the selected one computing node.

With reference to the third possible implementation manner of the first aspect, in a fifth possible implementation manner of the first aspect, the determining, according to a processing capability of the selected computing node and a resource usage rate of the selected stream processing unit, whether the selected computing node satisfies an allocation condition of the selected stream processing unit includes:

determining a required CPU resource Cunit and a required memory resource Munit of the selected stream processing unit according to the resource usage rate of the selected stream processing unit; and determining whether Cunit+Cused<Cmax_usage*Ncpu*Ccore is valid; if it is valid, determining whether Munit+Mused<Max_usage*Mpc is valid; if the two relational expressions are both valid, determining that the selected computing node satisfies the allocation condition of the selected stream processing unit; and if one relational expression is invalid, determining that the selected computing node does not satisfy the allocation condition of the selected stream processing unit;

where the Cmax_usage is a preset upper CPU usage rate limit, the Max_usage is a preset upper memory usage rate limit, the Cused is a CPU resource used by a stream processing unit that is allocated to the selected computing node, Ncpu is the number of CPUs of the selected computing node, Ccore is a CPU frequency of the selected computing node, Mused is a memory resource used by the stream processing unit that is allocated to the selected computing node, and Mpc is the total amount of memory of the selected computing node.

With reference to the third possible implementation manner of the first aspect, in a sixth possible implementation manner of the first aspect, the selecting one stream processing unit for the selected computing node from stream processing units to be allocated includes:

if a stream processing unit connected to a data source exists in the stream processing units to be allocated, selecting, from stream processing units to be allocated that are connected to the data source, one stream processing unit as the stream processing unit selected for the selected computing node.

With reference to the third possible implementation manner of the first aspect, in a seventh possible implementation manner of the first aspect, the selecting one stream processing unit for the selected computing node from stream processing units to be allocated includes:

if no stream processing unit connected to a data source exists in the stream processing units to be allocated, selecting, from a stream processing unit to be allocated that is connected to a stream processing unit that is selected last time, one stream processing unit as the stream processing unit selected for the selected computing node.

According to a second aspect, an apparatus for allocating a stream processing unit is provided, where the apparatus includes:

an obtaining module, configured to obtain a parallelism degree and a resource usage rate of each stream processing component on each computing node, where the parallelism degree is used to indicate the number of stream processing units included in a stream processing component;

a first determining module, configured to determine the number of stream processing units included in any one stream processing component according to a parallelism degree of the any one stream processing component of the stream processing components;

a generating module, configured to generate at least one stream processing unit to be allocated corresponding to the stream processing components;

a second determining module, configured to determine a resource usage rate of any one stream processing component as a resource usage rate of any one stream processing unit corresponding to the any one stream processing component; and an allocating module, configured to: according to a processing capability of a computing node on which each stream processing component is located and a resource usage rate of each stream processing unit to be allocated, allocate each stream processing unit to be allocated to a corresponding computing node.

With reference to the second aspect, in a first possible implementation manner of the second aspect, the obtaining module includes:

a testing unit, configured to: for any one stream processing component on any one computing node, test an initial output rate and a maximum output rate of the any one stream processing component by using a stream testing component;

a recording unit, configured to record a resource usage rate corresponding to the any one stream processing component when the any one stream processing component is at the initial output rate and a resource usage rate corresponding to the any one stream processing component at the maximum output rate;

a first determining unit, configured to determine a ratio of the maximum output rate to the initial output rate, which are recorded by the recording unit, of the any one stream processing component as a parallelism degree of the any one stream processing component; and a second determining unit, configured to determine a resource usage rate of the any one stream processing component according to the parallelism degree, which is determined by the first determining unit, of the any one stream processing component.

With reference to the second aspect, in a second possible implementation manner of the second aspect, the first determining module is configured to round up the parallelism degree of the any one stream processing component to obtain an up-rounded value, and use the up-rounded value as the number of stream processing units included in the any one stream processing component.

With reference to the second aspect, in a third possible implementation manner of the second aspect, the allocating module includes:

a first selecting unit, configured to select one computing node from computing nodes on which the stream processing components are located;

a second selecting unit, configured to: for the selected computing node on which the stream processing components are located, select one stream processing unit for the selected computing node from stream processing units to be allocated;

a determining unit, configured to: according to a processing capability of the computing node selected by the first selecting unit and a resource usage rate of a stream processing unit selected by the second selecting unit, determine whether the selected computing node satisfies an allocation condition of the selected stream processing unit; and an allocating unit, configured to: when the determining unit determines that the allocation condition is satisfied, allocate the selected stream processing unit to the selected computing node.

With reference to the third possible implementation manner of the second aspect, in a fourth possible implementation manner of the second aspect, the first selecting unit is configured to determine central processing unit CPU average usage rates Cavg_usage and memory average usage rates Mavg_usage of all stream processing components according to the resource usage rate of each stream processing component on each computing node; select one computing node from the computing nodes on which the stream processing components are located and determine whether Cused≥Cavg_usage*Ncpu*Ccore or Mused≥Mavg_usage*Mpc is valid, and if invalid, use the selected one computing node as the selected computing node;

where the Cused is a CPU resource used by a stream processing unit that is allocated to the selected one computing node, Ncpu is the number of CPUs of the selected one computing node, Ccore is a CPU frequency of the selected one computing node, Mused is a memory resource used by the stream processing unit that is allocated to the selected one computing node, and Mpc is the total amount of memory of the selected one computing node.

With reference to the third possible implementation manner of the second aspect, in a fifth possible implementation manner of the second aspect, the determining unit is configured to determine a required CPU resource Cunit and a required memory resource Munit of the selected stream processing unit according to a resource usage rate of the selected stream processing unit; determine whether Cunit+Cused<Cmax_usage*Ncpu*Ccore is valid; if it is valid, determine whether Munit+Mused<Max_usage*Mpc is valid; if the two relational expressions are both valid, determine that the selected computing node satisfies the allocation condition of the selected stream processing unit; and if one relational expression is invalid, determine that the selected computing node does not satisfy the allocation condition of the selected stream processing unit;

where the Cmax_usage is a preset upper CPU usage rate limit, the Max_usage is a preset upper memory usage rate limit, the Cused is a CPU resource used by a stream processing unit that is allocated to the selected computing node, Ncpu is the number of CPUs of the selected computing node, Ccore is a CPU frequency of the selected computing node, Mused is a memory resource used by the stream processing unit that is allocated to the selected computing node, and Mpc is the total amount of memory of the selected computing node.

With reference to the third possible implementation manner of the second aspect, in a sixth possible implementation manner of the second aspect, the selecting unit is configured to: if a stream processing unit connected to a data source exists in the stream processing units to be allocated, select, from stream processing units to be allocated that are connected to the data source, one stream processing unit as the stream processing unit selected for the selected computing node.

With reference to the fifth possible implementation manner of the second aspect, in a seventh possible implementation manner of the second aspect, the selecting unit is configured to: if no stream processing unit connected to a data source exists in the stream processing units to be allocated, select, from a stream processing unit to be allocated that is connected to a stream processing unit that is selected last time, one stream processing unit as the stream processing unit selected for the selected computing node.

The technical solutions provided by the embodiments of the present invention bring the following beneficial effects:

The number of stream processing units included in any one stream processing component is determined according to a parallelism degree of the any one stream processing component, at least one stream processing unit to be allocated corresponding to stream processing components is generated, and each stream processing unit to be allocated is allocated to a corresponding computing node according to a processing capability of a computing node on which each stream processing component is located and a resource usage rate of each stream processing unit to be allocated, so that the processing capability of the computing node on which each stream processing component is located satisfies a resource usage rate of a stream processing unit allocated to the computing node, thereby improving the data stream processing efficiency of a distributed stream processing system.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention more comprehensible, the following further describes the embodiments of the present invention in detail with reference to the accompanying drawings.

Figure 1:
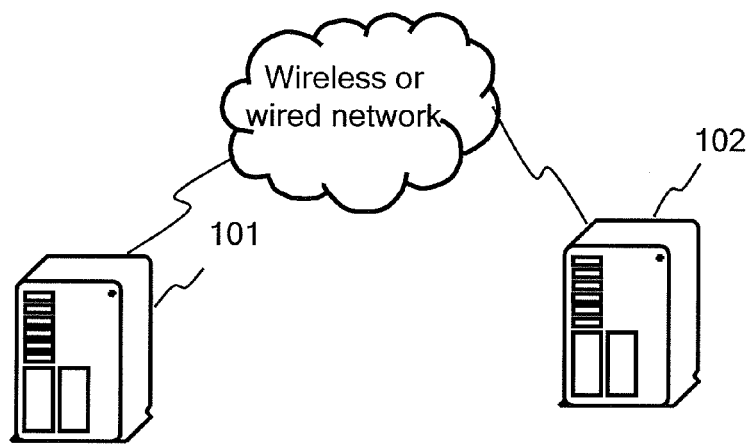
FIG. 1 is a structural diagram of an implementation environment involved in a method for allocating a stream processing unit according to the present invention.

The embodiments of the present invention provide a method for allocating a stream processing unit. Refer to FIG. 1, which shows a schematic structural diagram of an implementation environment involved in the method for allocating a stream processing unit provided by the embodiments of the present invention. The implementation environment includes a stream system service module 101 and a stream system processing module 102.

An apparatus for allocating a stream processing unit runs on the stream system service module 101, where the apparatus for allocating a stream processing unit is an apparatus for allocating a stream processing unit according to the following Embodiment 3. In addition, the stream system service module 101 may be an independent computing device, and may also be a computing device on which the stream system processing module 102 is located.

A stream processing component, a stream processing unit, and a stream testing component run on the stream system processing module 102 to process stream data. In addition, the stream system processing module 102 may be an independent computing device, and may also be a computing device on which the stream system service module 101 is located.

The stream system service module 101 and the stream system processing module 102 may communicate with each other by using a wireless network or a wired network.

Embodiment 1

Figure 2:
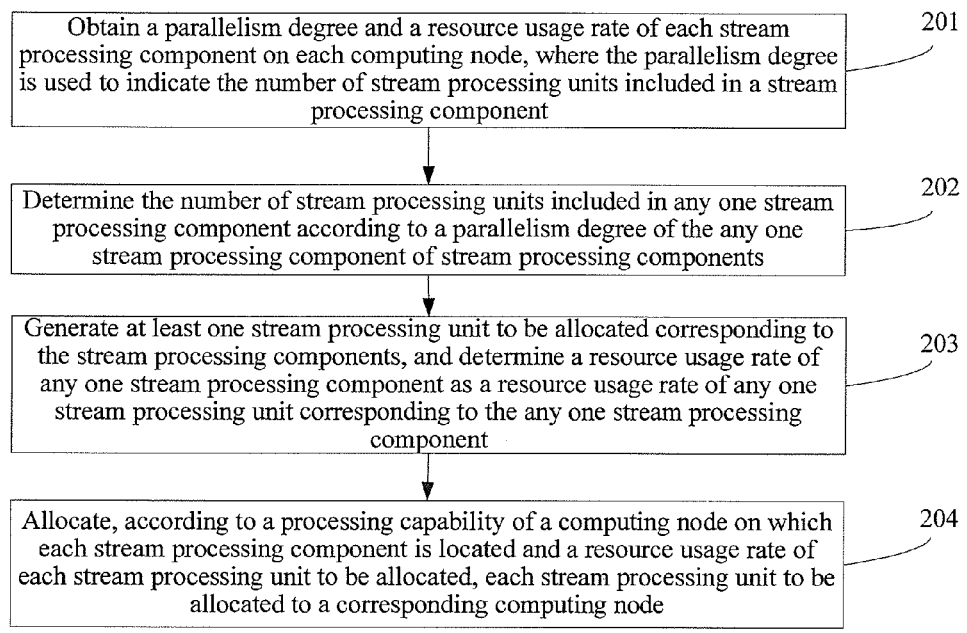
FIG. 2 is a flowchart of a method for allocating a stream processing unit according to Embodiment 1 of the present invention.

This embodiment provides a method for allocating a stream processing unit. Referring to FIG. 2, the method provided by this embodiment includes the following steps:

201. Obtain a parallelism degree and a resource usage rate of each stream processing component on each computing node, where the parallelism degree is used to indicate the number of stream processing units included in a stream processing component.

Preferably, the obtaining a parallelism degree and a resource usage rate of each stream processing component on each computing node includes:

for any one stream processing component on any one computing node, testing an initial output rate and a maximum output rate of the any one stream processing component by using a stream testing component, and recording a resource usage rate corresponding to the any one stream processing component when the any one stream processing component is at the initial output rate and a resource usage rate corresponding to the any one stream processing component at the maximum output rate; and determining a ratio of the maximum output rate to the initial output rate of the any one stream processing component as a parallelism degree of the any one stream processing component, and determining a resource usage rate of the any one stream processing component according to the parallelism degree of the any one stream processing component.

202. Determine the number of stream processing units included in any one stream processing component according to a parallelism degree of the any one stream processing component of the stream processing components.

Preferably, the determining the number of stream processing units included in any one stream processing component according to a parallelism degree of the any one stream processing component includes:

rounding up the parallelism degree of the any one stream processing component to obtain an up-rounded value, and using the up-rounded value as the number of stream processing units included in the any one stream processing component.

203. Generate at least one stream processing unit to be allocated corresponding to the stream processing components, and determine a resource usage rate of any one stream processing component as a resource usage rate of any one stream processing unit corresponding to the any one stream processing component.

For this step, the stream processing unit is configured to process stream data.

204. Allocate, according to a processing capability of a computing node on which each stream processing component is located and a resource usage rate of each stream processing unit to be allocated, each stream processing unit to be allocated to a corresponding computing node.

Preferably, the allocating, according to a processing capability of a computing node on which each stream processing component is located and a resource usage rate of each stream processing unit to be allocated, each stream processing unit to be allocated to a corresponding computing node includes:

for any one computing node on which each stream processing component is located, selecting one stream processing unit for the any one computing node from stream processing units to be allocated;

determining, according to a processing capability of the any one computing node and a resource usage rate of the selected stream processing unit, whether the any one computing node satisfies an allocation condition of the selected stream processing unit; and if the allocation condition is satisfied, allocating the selected stream processing unit to the any one computing node.

Preferably, the resource usage rate of the selected stream processing unit includes a central processing unit CPU average usage rate Cavg_usage and a memory average usage rate Mavg_usage.

The determining, according to a processing capability of the any one computing node and a resource usage rate of the selected stream processing unit, whether the any one computing node satisfies an allocation condition of the selected stream processing unit includes:

determining whether Cused≥Cavg_usage*Ncpu*Ccore or Mused≥Mavg_usage*Mpc is valid; if valid, determining that the any one computing node satisfies the allocation condition of the selected stream processing unit; and if invalid, determining that the any one computing node does not satisfy the allocation condition of the selected stream processing unit;

where Cused is a CPU resource used by a stream processing unit that is allocated to the any one computing node, Ncpu is the number of CPUs of the any one computing node, Ccore is a CPU frequency of the any one computing node, Mused is a memory resource used by the stream processing unit that is allocated to the any one computing node, and Mpc is the total amount of memory of the any one computing node.

Optionally, the resource usage rate of the selected stream processing unit includes a required CPU resource Cunit, a required memory resource Munit, an upper CPU usage rate limit Cmax_usage, and an upper memory usage rate limit Max_usage.

The determining, according to a processing capability of the any one computing node and a resource usage rate of the selected stream processing unit, whether the any one computing node satisfies an allocation condition of the selected stream processing unit includes:

determining whether Cunit+Cused<Cmax_usage*Ncpu* Ccore is valid; if valid, determining whether Munit+ Mused<Max_usage*Mpc is valid; if the two relational expressions are both valid, determining that the any one computing node satisfies the allocation condition of the selected stream processing unit; and if one relational expression is invalid, determining that the any one computing node does not satisfy the allocation condition of the selected stream processing unit;

where Cused is a CPU resource used by a stream processing unit that is allocated to the any one computing node, Ncpu is the number of CPUs of the any one computing node, Ccore is a CPU frequency of the any one computing node, Mused is a memory resource used by the stream processing unit that is allocated to the any one computing node, and Mpc is the total amount of memory of the any one computing node.

Preferably, the selecting one stream processing unit for the any one computing node from stream processing units to be allocated includes:

if a stream processing unit connected to a data source exists in the stream processing units to be allocated, selecting, from stream processing units to be allocated that are connected to the data source, one stream processing unit as the stream processing unit selected for the any one computing node.

Optionally, the selecting one stream processing unit for the any one computing node from stream processing units to be allocated includes:

if no stream processing unit connected to a data source exists in the stream processing units to be allocated, selecting, from a stream processing unit to be allocated that is connected to a stream processing unit that is selected last time, one stream processing unit as the stream processing unit selected for the any one computing node.

According to the method provided by this embodiment of the present invention, the number of stream processing units included in any one stream processing component is determined according to a parallelism degree of the any one stream processing component, at least one stream processing unit to be allocated corresponding to the stream processing component is generated, and each stream processing unit to be allocated is allocated to a corresponding computing node according to a processing capability of a computing node on which each stream processing component is located and a resource usage rate of each stream processing unit to be allocated, so that the processing capability of the computing node on which each stream processing component is located satisfies a resource usage rate of a stream processing unit allocated to the computing node, thereby improving the data stream processing efficiency of a distributed stream processing system.

Embodiment 2

This embodiment of the present invention provides a method for allocating a stream processing unit. With reference to content of the foregoing Embodiment 1, for ease of description, in this embodiment, the method for allocating a stream processing unit provided by this embodiment is described by using a schematic diagram of a stream processing task shown in FIG. 3 as an example, using a structure of any one stream testing component shown in FIG. 4 as an example, and using a schematic diagram of a test procedure of a stream processing component shown in FIG. 5 as an example. The stream processing task in FIG. 3 includes two stream data sources, namely, a stream data source A and a stream data source B, and three stream processing components, namely, a stream processing component A, a stream processing component B, and a stream processing component C, where one stream processing component is located on one computing node. The stream testing component in FIG. 4 includes a stream statistics component 401, a stream caching component 402, a variable-rate stream outputting component 403, and an interacting component 404. The test procedure of the stream processing component in FIG. 5 includes two stream data sources, namely, a stream data source A and a stream data source B; three stream processing components, namely, a stream processing component A, a stream processing component B, and a stream processing component C, where one stream processing component is located on one computing node; and six stream testing components, namely, a stream testing component A, a stream testing component B, a stream testing component C, a stream testing component D, a stream testing component E, and a stream testing component F. Referring to FIG. 6, a procedure of the method provided by this embodiment includes the following steps:

601. Obtain a parallelism degree P and a resource usage rate of each stream processing component on each computing node.

For this step, the parallelism degree is used to indicate the number of stream processing units included in a stream processing component. This embodiment does not limit a specific implementation method for obtaining the P and the resource usage rate of each stream processing component on each computing node, which includes but is not limited to obtaining the P and the resource usage rate of each stream processing component on each computing node by using the following two steps:

First step: For any one stream processing component on any one computing node, test an initial output rate and a maximum output rate of the any one stream processing component by using a stream testing component, and record a resource usage rate corresponding to the any one stream processing component when the any one stream processing component is at the initial output rate and a resource usage rate corresponding to the any one stream processing component at the maximum output rate.

Figure 4:
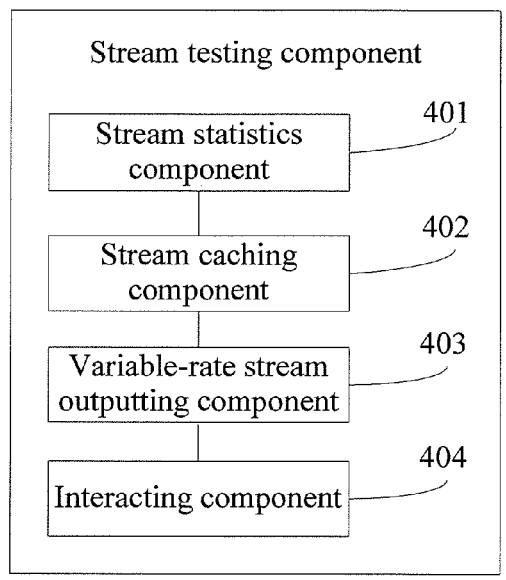
FIG. 4 is a schematic structural diagram of a stream testing component according to Embodiment 2 of the present invention.

Specific implementation of the first step, for any one stream processing component, may be implemented by using the following substeps:

First substep: As shown in FIG. 4, activate a stream data input of a first stream testing component connected to an input of a stream processing component, collect statistics, by a stream statistics component 401 in the first stream testing component, on an input rate of stream data at this time, use the rate as an initial output rate of the stream processing component, and cache, by a stream caching component 402 in the first stream testing component, stream data flowing into the first stream testing component.

For the first substep, this embodiment does not limit a specific form of the stream data flowing into the first stream testing component. The stream data flowing into the first stream testing component includes but is not limited to two types: a first type is stream data flowing into the first stream testing component directly from a data source, and a second type is stream data cached by the stream caching component 402 in the first stream testing component.

Figure 5:
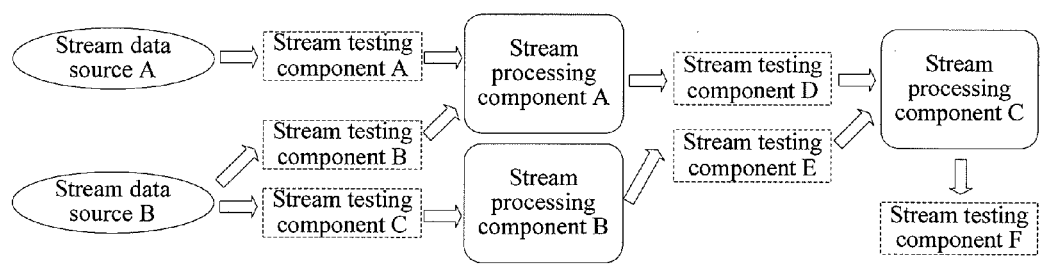
FIG. 5 is a schematic diagram of a test procedure of a stream processing component according to Embodiment 2 of the present invention.
Figure 6:
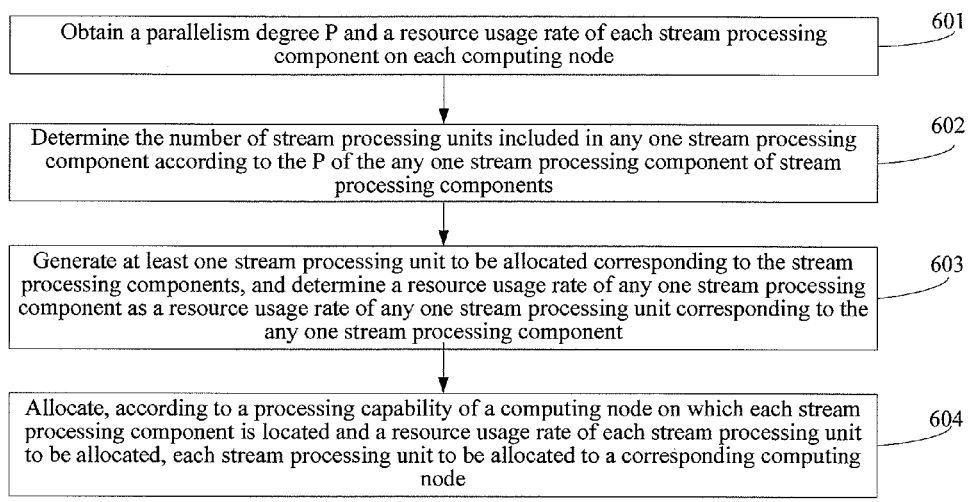
FIG. 6 is a flowchart of a method for allocating a stream processing unit according to Embodiment 2 of the present invention.

Specifically, in an example of the stream processing component A shown in FIG. 5, a first stream testing component is the stream testing component A connected to an input of the stream processing component A, and a stream statistics component 401 in the stream testing component A finds out by statistics that the input rate of stream data at this time is 0.3 GB/second. The 0.3 GB/second is used as an initial output rate of the stream processing component A, and a stream caching component 402 in the stream testing component A caches the stream data flowing into the stream testing component A. Certainly, the initial output rate may also be another value and unit, and this embodiment does not limit a specific value and unit of the initial output rate.

Second substep: Activate an output of the first stream testing component and an input of a second stream testing component connected to an output of the stream processing component.

Specifically, still in the example in the first substep, the second stream testing component is the stream testing component D connected to an output of the stream processing component A. The output of the stream testing component A and the input of the stream testing component D are activated.

Third substep: A variable-rate stream outputting component 403 in the first stream testing component enables the stream data cached by the stream caching component 402 to flow into the second stream testing component through the stream processing component by using a preset output rate as an output rate, and a stream caching component 402 in the second stream testing component caches the stream data flowing into the second stream testing component.

Specifically, still in the example of the second substep, if the preset output rate is 0 GB/second, accordingly, the variable-rate stream outputting component 403 in the stream testing component A enables the stream data cached by the stream caching component 402 to flow into the stream testing component D through the stream processing component A at the output rate of 0 GB/second, and a stream caching component 402 in the stream testing component D caches the stream data flowing into the stream testing component D. Certainly, the preset output rate may also be another value and unit, and this embodiment does not limit a specific value and unit of the preset output rate.

Fourth substep: The variable-rate stream outputting component 403 in the first stream testing component increases the output rate by a preset increase rate, and enables the stream data cached by the stream caching component 402 to flow into the second stream testing component through the stream processing component at the increased output rate, and repeats this cycle until the output rate of the variable-rate stream outputting component 403 in the first stream testing component is the initial output rate of the first stream testing component collected by the stream statistics component 401 in the first substep; and the stream statistics component 401 in the first stream testing component records a resource usage rate corresponding to the stream processing component when the first stream testing component is at the initial output rate.

For the fourth substep, the resource usage rate includes a CPU (Central Processing Unit, central processing unit) usage rate Cusage of the stream processing component and a memory usage rate Munit of the stream processing component. Moreover, the resource usage rate may further include other content, and this embodiment does not limit specific content included by the resource usage rate.

Specifically, in the example of the third substep, if a preset increase rate is 0.1 GB/second, accordingly, the variable-rate stream outputting component 403 in the stream testing component A increases 0 GB/second by 0.1 GB/second, and enables the stream data cached by the stream caching component 402 to flow into the stream testing component D through the stream processing component A at the increased 0.1 GB/second. The variable-rate stream outputting component 403 in the stream testing component A increases 0.1 GB/second by 0.1 GB/second again, and enables the stream data cached by the stream caching component 402 to flow into the stream testing component D through the stream processing component A at the increased 0.2 GB/second. The variable-rate stream outputting component 403 in the stream testing component A continues to increase 0.2 GB/second by 0.1 GB/second, and enables the stream data cached by the stream caching component 402 to flow into the stream testing component D through the stream processing component A at the increased 0.3 GB/second. At this time, the output rate of the variable-rate stream outputting component 403 in the stream testing component A is the initial output rate of the stream testing component A collected by the stream statistics component 401 in the first substep, and the stream statistics component 401 in the stream testing component A records a corresponding CPU usage rate Cusage1 of the stream processing component A and a memory usage rate Munit0 of the stream processing component A when the variable-rate stream outputting component 403 in the stream testing component A is at the output rate of 0.3 GB/second. This embodiment does not limit a specific value of the CPU usage rate of the corresponding stream processing component A and a specific value of the memory usage rate of the stream processing component A when the variable-rate stream outputting component 403 in the stream testing component A is at the output rate of 0.3 GB/second.

Fifth substep: As shown in FIG. 4, the variable-rate stream outputting component 403 in the first stream testing component continues to increase the output rate by the preset increase rate, and enables the stream data cached by the stream caching component 402 to flow into the second stream testing component through the stream processing component at the increased output rate, and repeats this cycle until the stream statistics component 401 in the second stream testing component finds out by testing that a rate of the stream data flowing into the second stream testing component remains unchanged. At this time, the output rate of the variable-rate stream outputting component 403 in the first stream testing component is a maximum output rate of the first stream testing component, and the stream statistics component 401 in the first stream testing component records a corresponding resource usage rate when the first stream testing component is at the maximum output rate.

For the fifth substep, this embodiment does not limit a specific test method for the stream statistics component 401 in the second stream testing component to find out by testing that the rate of the stream data flowing into the second stream testing component remains unchanged, which includes but is not limited to that the stream statistics component 401 in the second stream testing component finds out by testing that the rate of the stream data flowing into the second stream testing component remains unchanged after the variable-rate stream outputting component 403 in the first stream testing component increases the output rate, where at this time, it is regarded that the rate of the stream data flowing into the second stream testing component remains unchanged.

Specifically, in the example of the fourth substep, the variable-rate stream outputting component 403 in the stream testing component A continues to increase 0.3 GB/second by 0.1 GB/second, and enables the stream data cached by the stream caching component 402 to flow into the stream testing component D through the stream processing component A at the increased 0.4 GB/second. This cycle is repeated until the stream statistics component 401 in the stream testing component D finds out by testing that the rate of the stream data flowing into the stream testing component D remains unchanged. At this time, the output rate 0.5 GB/second of the variable-rate stream outputting component 403 in the stream testing component A is the maximum output rate of the stream testing component A; when the variable-rate stream outputting component 403 in the stream testing component A is at the output rate of 0.5 GB/second, a corresponding CPU usage rate of the stream processing component A, recorded by the stream statistics component 401 in the stream testing component A, is Cusage1 and a recorded memory usage rate of the stream processing component A is Munit1. Certainly, the maximum output rate of the stream testing component A may also be another value and unit, and this embodiment does not limit a specific value and unit of the maximum output rate of the stream testing component A. This embodiment does not limit a specific value of the CPU usage rate of the corresponding stream processing component A and a specific value of the memory usage rate of the stream processing component A when the variable-rate stream outputting component 403 in the stream testing component A is at the output rate of 0.5 GB/second.

Second step: Determine a ratio of the maximum output rate to the initial output rate of the any one stream processing component as a P of the any one stream processing component, and determine a resource usage rate of the any one stream processing component according to the P of the any one stream processing component.

For the second step, in this embodiment, a specific method for determining a P may also be another method besides the determining a ratio of the maximum output rate to the initial output rate of any one stream processing component as the P of the any one stream processing component, and this embodiment does not limit the specific method for determining a P.

Specifically, in the example of the first step, the P of the stream processing component A is a ratio of 0.5 GB/second to 0.3 GB/second, that is, 1.67.

In addition, this embodiment does not limit a specific method for determining a resource usage rate of the any one stream processing component according to the P of the any one stream processing component either. For example, if the P of the any one stream processing component is less than or equal to 1, the resource usage rate of the any one stream processing component is determined as a resource usage rate corresponding to the any one stream processing component at the initial output rate; and if the P of the any one stream processing component is greater than 1, the resource usage rate of the any one stream processing component is determined as a resource usage rate corresponding to the any one stream processing component at the initial output rate and a resource usage rate corresponding to the any one stream processing component at the maximum output rate.

Specifically, in the example of the first step, because the P of the stream processing component A is the ratio of 0.5 GB/second to 0.3 GB/second, that is, 1.67, the resource usage rate of the stream processing component A is Cusage0, Munit0, Cusage1, and Munit1.

For another example, a P of the stream processing component E is 0.67; accordingly, a resource usage rate of the stream processing component E is Cusage0 and Munit0.

Figure 3:
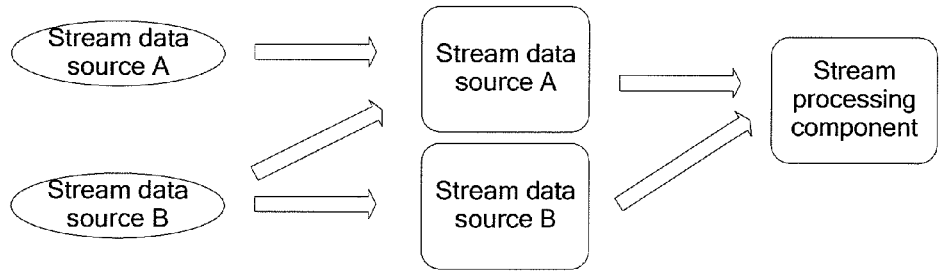
FIG. 3 is a schematic structural diagram of a stream processing task according to Embodiment 2 of the present invention.

It should be noted that, in order to use a stream testing component to obtain a P and a resource usage rate of each stream processing component on each computing node, before the P and the resource usage rate of each stream processing component on each computing node are obtained, a stream testing component needs to be added to the stream processing task shown in FIG. 3. This embodiment does not limit a specific method for adding a stream testing component into the stream processing task. For example, the stream testing component is added to the stream processing task shown in FIG. 3 by using a method shown in FIG. 5.

1. If a connection exists between a stream data source and a stream processing component, break the connection between the stream data source and the stream processing component, and connect an output of the stream data source to a stream testing component as an input of the stream testing component; and connect an output of the stream testing component to the stream processing component as an input of the stream processing component.

Specifically, in an example in which a connection exists between the data source A and the stream processing component A in FIG. 3 and the stream testing component A is added between the data source A and the stream processing component A, the connection between the stream data source A and the stream processing component A is broken, an output of the stream data source A is connected to the stream testing component A as an input of the stream testing component A; and an output of the stream testing component A is connected to the stream processing component A as an input of the stream processing component A.

2. If a connection exists between two stream processing components, break the connection between the two stream processing components, connect an output of a preceding stream processing component to a stream testing component as an input of the stream testing component, and connect an output of the stream testing component to a subsequent stream processing component as an input of the subsequent stream processing component.

Specifically, in an example in which a connection exists between the stream processing component A and the stream processing component C in FIG. 3, and a preceding stream processing component is the stream processing component A, a subsequent stream processing component is the stream processing component C, and the stream testing component D is added between the stream processing component A and the stream processing component C, the connection between the stream processing component A and the stream processing component C is broken, an output of the stream processing component A is connected to the stream testing component D as an input of the stream testing component D, and an output of the stream testing component D is connected to the stream processing component C as an input of the stream processing component C.

3. If an output of a stream processing component is saving data, connect the output of the stream processing component to a stream testing component as an input of the stream testing component, and set the output of the stream testing component to saving data.

For 3, this embodiment does not limit a specific manner of saving data. For example, data is saved to a file or data is saved to a database.

Specifically, if the output of the stream processing component C in FIG. 3 is saving data to a file, the output of the stream processing component C is connected to the stream testing component F as an input of the stream testing component F, and an output of the stream testing component F is set to saving data to a file.

In addition, a stream testing component functioning as an input of any one stream processing component and a stream testing component functioning as an output of the stream processing component jointly test the stream processing component. A same stream processing component may have multiple stream testing components functioning as inputs, and may also have multiple stream testing components functioning as outputs. Therefore, multiple groups of stream testing components may test a same stream processing component. It is possible that specific numeric test values of different groups of stream testing components on the same stream processing component are different because stream data conditions of the different groups of stream testing components are different; however, ratios regarding the specific numeric test values are the same. That is, although specific test results of the different groups of stream testing components on the same stream processing component are different, a P and a resource usage rate eventually determined according to the specific test results are the same. For a same stream processing component, if multiple Ps and resource usage rates of the stream processing component are obtained, one P and one resource usage rate of the stream processing component are selected from the multiple Ps and resource usage rates of the stream processing component as the P and the resource usage rate of the stream processing component. This embodiment does not limit a specific method for selecting one P and one resource usage rate of the stream processing component from multiple Ps and resource usage rates of the stream processing component as the P and resource usage rate of the stream processing component. For example, one P and resource usage rate of the stream processing component are randomly selected from the multiple Ps and resource usage rates of the stream processing component as the P and the resource usage rate of the stream processing component.

Specifically, as shown in FIG. 5, for the stream processing component A, two stream testing components, namely the stream testing component A and the stream testing component B, function as inputs of the stream processing component A; and one stream testing component, namely, the stream testing component D, functions as an output of the stream processing component A. Therefore, the stream testing component A and the stream testing component D jointly test the stream processing component A, and meanwhile, the stream testing component B and the stream testing component D jointly test the stream processing component A. It is possible that specific numeric test values of the stream testing component A and the stream testing component D on the stream processing component A are different from specific numeric test value of the stream testing component B and the stream testing component D on the stream processing component A because stream data conditions of the stream testing component A and the stream testing component B are different; however, a P and a resource usage rate determined according to the test result of the stream testing component A and the stream testing component D on the stream processing component A are the same as a P and a resource usage rate determined according to the test result of the stream testing component B and the stream testing component D on the stream processing component A. In this case, the P and the resource usage rate determined according to the test result of the stream testing component A and the stream testing component D on the stream processing component A are randomly selected from the P and the resource usage rate determined according to the test result of the stream testing component A and the stream testing component D on the stream processing component A and the P and the resource usage rate determined according to the test result of the stream testing component B and the stream testing component D on the stream processing component A as the P and the resource usage rate of the stream processing component A.

Moreover, this embodiment does not limit a specific method for obtaining a P and a resource usage rate of each stream processing component tested by the stream testing component. For example, a stream testing component generates, after testing a P and a resource usage rate of each stream processing component, a test result of the P and the resource usage rate, and sends the test result by using the interacting component 404. The apparatus for allocating a stream processing unit receives the test result sent by the stream testing component to obtain the P and the resource usage rate of each stream processing component on each computing node.

602. Determine, according to a P of any one stream processing component of stream processing components, the number of stream processing units included in the any one stream processing component.

For this step, this embodiment does not limit a specific method for determining, according to a P of any one stream processing component of stream processing components, the number of stream processing units included in the any one stream processing component. For example, a P of any one stream processing component of the stream processing components is rounded up to obtain an up-rounded value, and the up-rounded value is used as the number of stream processing units included in the any one stream processing component.

Specifically, in the example of step 601, P=1.67 of the stream processing component A is rounded up to obtain an up-rounded value 2, and 2 is used as the number of stream processing units included in the stream processing component A.

603. Generate at least one stream processing unit to be allocated corresponding to the stream processing components, and determine a resource usage rate of any one stream processing component as a resource usage rate of any one stream processing unit corresponding to the any one stream processing component.

For this step, a method for determining a resource usage rate of any one stream processing unit corresponding to the any one stream processing component may also be another method besides the determining a resource usage rate of anyone stream processing component as a resource usage rate of any one stream processing unit corresponding to the any one stream processing component, and this embodiment does not limit a specific method for determining a resource usage rate of any one stream processing unit corresponding to the any one stream processing component.

Specifically, in the example of step 602, two stream processing units to be allocated, namely, a stream processing unit A and a stream processing unit B, corresponding to the stream processing component A are generated, and resource usage rates Cusage0, Munit0, Cusage1, and Munit1 of the stream processing component A are determined as resource usage rates of the stream processing unit A, and resource usage rates Cusage0, Munit0, Cusage1, and Munit1 of the stream processing component A are also determined as resource usage rates of the stream processing unit B.

Figure 7:
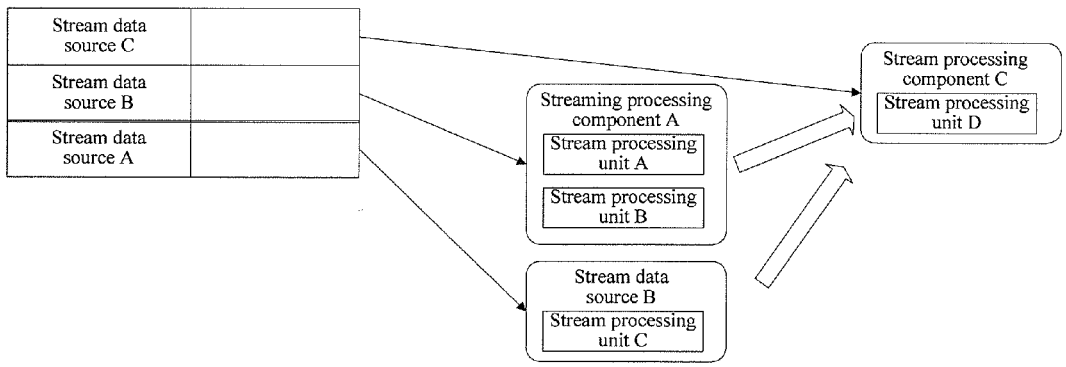
FIG. 7 is a schematic diagram of a storing manner of a stream processing unit according to Embodiment 2 of the present invention.

In addition, this embodiment does not limit a method for storing the generated at least one stream processing unit to be allocated corresponding to the stream processing components, which includes but is not limited to storing in a manner of a directional diagram shown in FIG. 7.

604. Allocate, according to a processing capability of a computing node on which each stream processing component is located and a resource usage rate of each stream processing unit to be allocated, each stream processing unit to be allocated to a corresponding computing node.

For this step, this embodiment does not limit a specific method for allocating, according to a processing capability of a computing node on which each stream processing component is located and a resource usage rate of each stream processing unit to be allocated, each stream processing unit to be allocated to a corresponding computing node, which includes but is not limited to performing allocation according to the following steps:

Step 1: Select one computing node from computing nodes on which the stream processing components are located.

For step 1, this embodiment does not limit a specific method for selecting one computing node from computing nodes on which the stream processing components are located, which includes but is not limited to determining any one computing node by using the following three substeps:

Substep 1: Determine CPU average usage rates Cavg_usage and memory average usage rates Mavg_usage of all stream processing components according to the resource usage rate of each stream processing component on each computing node.

For substep 1 of step 1, this embodiment does not limit a specific method for determining Cavg_usage rates of all stream processing components according to the resource usage rate of each stream processing component on each computing node. For example, Cavg_usages of all the stream processing components are determined by using the following method:

1. Quantize CPU usage rates of stream processing components on the computing nodes according to a formula $Cunit=\Sigma Ccore*Cusage$ to obtain a quantized value Cunit.

For 1 in step 1, Ccore is a CPU frequency on any one computing node. In addition, if an obtained CPU usage rate of a stream processing component includes a CPU usage rate Cusage0 corresponding to the stream processing component at an initial output rate and a CPU usage rate Cusage1 corresponding to the stream processing component at a maximum output rate, a smaller resource usage rate of Cusage0 and Cusage1 is used as Cusage.

Specifically, in the example in which a parallelism degree and a resource usage rate of stream processing components on two computing nodes are obtained in step 601, where a P of a stream processing component 1 on a computing node 1 is P1, where P1<1, a CPU usage rate corresponding to the stream processing component 1 when the resource usage rate is an initial output rate is Cusage10, and a memory usage rate corresponding to the stream processing component 1 at the initial output rate is Munit10; a P of a stream processing component 2 on a computing node 2 is P2, where P2>1, a CPU usage rate corresponding to the stream processing component 2 when the resource usage rate is an initial output rate is Cusage20, a memory usage rate of the stream processing component 2 when the resource usage rate is the initial output rate is Munit20, a CPU usage rate corresponding to the stream processing component 2 when the resource usage rate is a maximum output rate is Cusage21, and a memory usage rate of the stream processing component 2 when the resource usage rate is the maximum output rate is Munit21, where Cusage20<Cusage21, and Munit20<Munit21. The computing node 1 has two CPUs, where a Ccore of the CPUs is Ccore1, and the computing node 2 has one CPU, where a Ccore of the CPU is Ccore2. Therefore, Cunit1=Ccore1*Cusage10+Ccore1**Cusage20, and Cunit2=Ccore2*Cusage10+Ccore2*Cusage20. This embodiment does not limit a specific name of a computing node; this embodiment does not limit a specific name or size of P either, this embodiment does not limit a specific name of the CPU usage rate and memory usage rate either, and this embodiment does not limit values of Cusage20 and Cusage21, or values of Munit20 and Munit21.

2. Obtain a required CPU usage rate of all stream processing components according to a formula $C=\Sigma P*Cunit$.

Specifically, in the example of substep 1, C=P1*Cunit1+P2*Cunit2.

3. Obtain the total number of CPU resources of all computing nodes according to a formula $Call=\Sigma Ncpu*Ccore$.

For 3 in step 3, Ncpu is the number of CPUs of any one computing node.

Specifically, in the example of 1 in substep 1, Call=2*Ccore1+1* Ccore2.

4. Obtain Cavg_usage according to a formula Cavg_usage=C/Call

In addition, this embodiment does not limit a specific method for determining Mavg_usage of all stream processing components according to the resource usage rate of each stream processing component on each computing node either. For example, Mavg_usage of all the stream processing components is determined by using the following steps:

1. Obtain a required memory usage rate of all stream processing components according to a formula $M=\Sigma P*Munit$; and if it is obtained that a memory usage rate of a stream processing component includes a memory usage rate Munit0 corresponding to the stream processing component at an initial output rate and a memory usage rate Munit1 corresponding to the stream processing component at a maximum output rate, use a smaller memory usage rate of Munit0 and Munit1 as Munit.

Specifically, in the example of substep 1, $M=P1*Munit10+P2*Munit20$.

2. Obtain the total available memory of all computing nodes according to a formula $Mall=\Sigma Mpc$, where Mpc is the total amount of memory of any computing node.

Specifically, in the example of 1 in substep 1, if Mpc of the computing node 1 in 1 of substep 1 is Mpc1, and Mpc of the computing node 2 is Mpc2, $Mall=Mpc21+Mpc22$.

3. Obtain Mavg_usage according to a formula $Mavg\_usage=M/Mall$

Substep 2: Select one computing node from the computing nodes on which the stream processing components are located as any one computing node.

Substep 3: Determine whether $Cused \geq Cavg\_usage*Ncpu*Ccore$ or $Mused \geq Mavg\_usage*Mpc$ is valid; if not valid, perform step 2; if valid, repeat substep 1 to substep 3 until a stream processing unit for which $Cused \geq Cavg\_usage*Ncpu*Ccore$ or $Mused \geq Mavg\_usage*Mpc$ is invalid is selected, or the procedure is ended when $Cused \geq Cavg\_usage*Ncpu*Ccore$ or $Mused \geq Mavg\_usage*Mpc$ is valid for all stream processing units.

For substep 3 of step 1, Cused is a CPU resource used by a stream processing unit that is allocated to any one computing node, and Mused is a memory resource used by the stream processing unit that is allocated to any one computing node.

In addition, this embodiment does not limit a method for determining Cused and Mused. For example, each time one stream processing unit is allocated to any one computing node, a CPU resource and a memory resource used the stream processing unit are recorded, and the recorded a used CPU resource and the recorded a used memory resource of all stream processing units that are allocated to the computing node are added up to obtain Cused and Mused.

Step 2: For the selected computing node, select one stream processing unit for the computing node from stream processing units to be allocated.

For step 2, this embodiment does not limit a specific method for selecting one stream processing unit for the selected computing node from stream processing units to be allocated, which includes but is not limited to selecting one stream processing unit for the selected computing node from stream processing units to be allocated by using the following selecting method:

if a stream processing unit connected to a data source exists in the stream processing units to be allocated, selecting, from stream processing units to be allocated that are connected to the data source, one stream processing unit as the stream processing unit selected for the selected computing node; and if no stream processing unit connected to a data source exists in the stream processing units to be allocated, selecting, from a stream processing unit to be allocated that is connected to a stream processing unit that is selected last time, one stream processing unit as the stream processing unit selected for the selected computing node. By selecting one stream processing unit from the stream processing unit to be allocated that is connected to the stream processing unit selected last time, as the stream processing unit selected for the selected computing node, network transmission between computing nodes is effectively reduced, thereby improving the performance of data stream processing.

Step 3: According to a processing capability of the selected computing node and a resource usage rate of the selected stream processing unit, determine whether the selected computing node satisfies an allocation condition of the selected stream processing unit; and if the allocation condition is satisfied, perform step 4; if the allocation condition is not satisfied, perform step 5.

For step 3, this embodiment does not limit a specific method for determining, according to a processing capability of the selected computing node and a resource usage rate of the selected stream processing unit, whether the selected computing node satisfies the allocation condition of the selected stream processing unit, which includes but is not limited to determining whether the selected computing node satisfies the allocation condition of the selected stream processing unit by using the following method:

Substep 1: Determine a required Cunit and a required Munit of the selected stream processing unit according to the resource usage rate of the selected stream processing unit.

For substep 1 of step 3, this embodiment does not limit a specific method for determining a required Cunit of the selected stream processing unit according to the resource usage rate of the selected stream processing unit, which includes but is not limited to determining according to the formula $Cunit=\Sigma Ccore*Cusage$ in step 1. Reference may be made to step 1 for details, which are not repeatedly described herein.

In addition, this embodiment does not limit a specific method for determining a required Munit of the selected stream processing unit according to the resource usage rate of the selected stream processing unit either, which includes but is not limited to determining, according to a fact that Munit in the resource usage rate of the selected stream processing unit is a memory usage rate Munit0 corresponding to the stream processing component when the resource usage rate of the selected stream processing unit includes the initial output rate, Munit0 as the required Munit of the selected stream processing unit. If the resource usage rate of the selected stream processing unit includes the memory usage rate Munit0 corresponding to the stream processing component at the initial output rate and a memory usage rate Munit1 corresponding to the stream processing component at the maximum output rate, determine a smaller memory usage rate of Munit0 and Munit1 as Munit.

Substep 2: Determine whether $Cunit+Cused<Cmax\_usage*Ncpu*Ccore$ is valid; if valid, determine whether $Munit+Mused<Max\_usage*Mpc$ is valid; if the two relational expressions are both valid, determine that the selected computing node satisfies the allocation condition of the selected stream processing unit; and if one relational expression is invalid, determine that the selected computing node does not satisfy the allocation condition of the selected stream processing unit.

For substep 2 of step 3, Cmax_usage is a preset upper CPU usage rate limit, and Max_usage is a preset upper memory usage rate limit.

This embodiment does not limit a specific setting method or a specific preset value of Cmax_usage. For example, Cmax_usage is set to be any one value within a range (Cavg_usage, 1) according to the Cavg_usage obtained in step 1. This embodiment does not limit a specific setting method or a specific preset value of Max_usage. For example, Max_usage is set to be any one value within a range (Mavg_usage, 1) according to the Mavg_usage obtained in step 1. This embodiment does not limit a specific setting method or a specific preset value of Cmax_usage. For example, Cmax_usage is set to be any one value within a range (Cavg_usage, 1) according to the Cavg_usage obtained in step 1.

Step 4: Allocate the selected stream processing unit to the selected computing node.

Step 5: Repeatedly perform step 2 to step 3 until it is determined, according to the processing capability of the selected computing node and the resource usage rate of the selected stream processing unit, that the selected computing node satisfies the allocation condition of the selected stream processing unit, or no selected computing node satisfies the allocation condition of all selected stream processing units, and then perform step 1 to re-select a computing node.

According to the method provided by this embodiment, the number of stream processing units included in any one stream processing component is determined according to a parallelism degree of the any one stream processing component, at least one stream processing unit to be allocated corresponding to stream processing component is generated, and each stream processing unit to be allocated is allocated to a corresponding computing node according to a processing capability of a computing node on which each stream processing component is located and a resource usage rate of each stream processing unit to be allocated, so that the processing capability of the computing node on which each stream processing component is located satisfies a resource usage rate of a stream processing unit allocated to the computing node, thereby improving the stream data processing efficiency of a distributed stream processing system.

Embodiment 3

Figure 8:
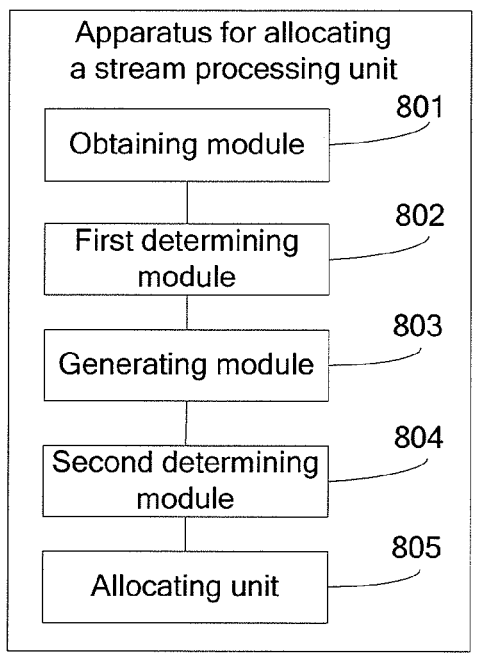
FIG. 8 is a schematic structural diagram of an apparatus for allocating a stream processing unit according to Embodiment 3 of the present invention.

This embodiment of the present invention provides an apparatus for allocating a stream processing unit. Referring to FIG. 8, the apparatus includes:

an obtaining module 801, configured to obtain a parallelism degree and a resource usage rate of each stream processing component on each computing node, where the parallelism degree is used to indicate the number of stream processing units included in a stream processing component;

a first determining module 802, configured to determine the number of stream processing units included in any one stream processing component according to a parallelism degree of the any one stream processing component of stream processing components;

a generating module 803, configured to generate at least one stream processing unit to be allocated corresponding to the stream processing components;

a second determining module 804, configured to determine a resource usage rate of any one stream processing component as a resource usage rate of any one stream processing unit corresponding to the any one stream processing component; and an allocating unit 805, configured to: according to a processing capability of a computing node on which each stream processing component is located and a resource usage rate of each stream processing unit to be allocated, allocate each stream processing unit to be allocated to a corresponding computing node.

Figure 9:
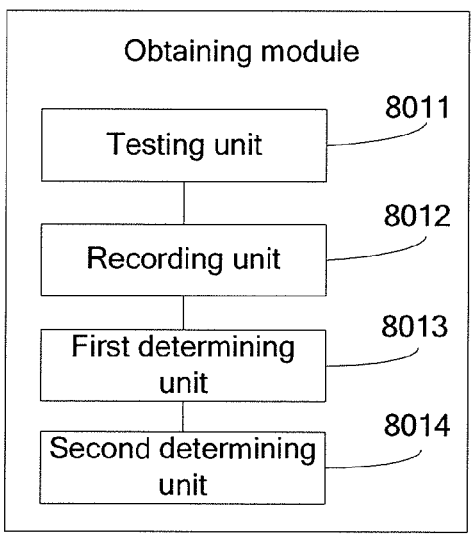
FIG. 9 is a schematic structural diagram of an obtaining module according to Embodiment 3 of the present invention.

Referring to FIG. 9, the obtaining module 801 includes:

a testing unit 8011, configured to: for any one stream processing component on any one computing node, test an initial output rate and a maximum output rate of the any one stream processing component by using a stream testing component;

a recording unit 8012, configured to record a resource usage rate corresponding to the any one stream processing component when the any one stream processing component is at the initial output rate and a resource usage rate corresponding to the any one stream processing component at the maximum output rate;

a first determining unit 8013, configured to determine a ratio of the maximum output rate to the initial output rate, which are recorded by the recording unit 8012, of the any one stream processing component as a parallelism degree of the any one stream processing component; and a second determining unit 8014, configured to determine the resource usage rate of the any one stream processing component according to the parallelism degree, which is determined by the first determining unit 8013, of the any one stream processing component.

Preferably, the first determining module 802 is configured to round up the parallelism degree of the any one stream processing component to obtain an up-rounded value, and use the up-rounded value as the number of stream processing units included in the any one stream processing component.

Figure 10:
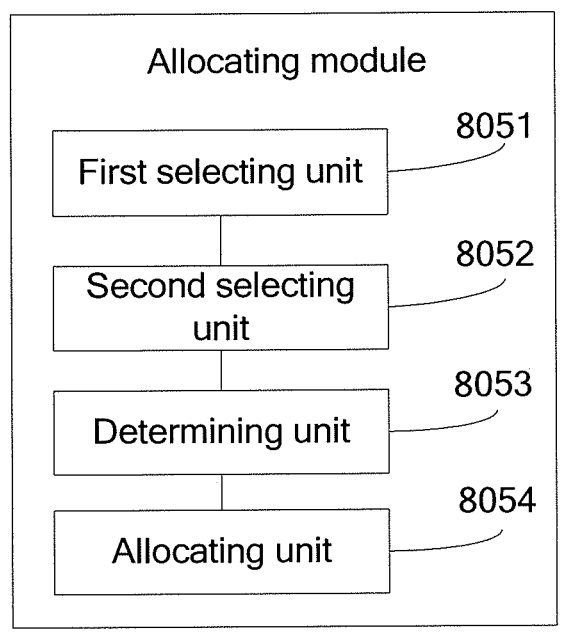
FIG. 10 is a schematic structural diagram of an allocating module according to Embodiment 3 of the present invention.

Referring to FIG. 10, the allocating module 805 includes:

a first selecting unit 8051, configured to select one computing node from computing nodes on which the stream processing components are located;

a second selecting unit 8052, configured to: for the selected computing node, select one stream processing unit for the selected computing node from stream processing units to be allocated;

a determining unit 8053, configured to: according to a processing capability of the computing node selected by the first selecting unit 8051 and a resource usage rate of a stream processing unit selected by the second selecting unit 8052, determine whether the selected computing node satisfies an allocation condition of the selected stream processing unit; and an allocating unit 8054, configured to: when the determining unit 8053 determines that the allocation condition is satisfied, allocate the selected stream processing unit to the selected computing node.

Preferably, the first selecting unit 8051 is configured to determine central processing unit CPU average usage rates Cavg_usage and memory average usage rates Mavg_usage of all stream processing components according to the resource usage rate of each stream processing component on each computing node; and select one computing node from the computing nodes on which the stream processing components are located and determine whether Cused≥Cavg_usage*Ncpu*Ccore or Mused≥Mavg_usage*Mpc is valid, and if valid, use the selected one computing node as the selected computing node;

where Cused is a CPU resource used by a stream processing unit that is allocated to the selected one computing node, Ncpu is the number of CPUs of the selected one computing node, Ccore is a CPU frequency of the selected one computing node, Mused is a memory resource used by the stream processing unit that is allocated to the selected one computing node, and Mpc is the total amount of memory of the selected one computing node.

Preferably, the determining unit 8053 is configured to determine a required CPU resource Cunit and a required memory resource Munit of the selected stream processing unit according to the resource usage rate of the selected stream processing unit; and determine whether Cunit+Cused<Cmax_usage*Ncpu*Ccore is valid; if valid, determine whether Munit+Mused<Max_usage*Mpc is valid; if the two relational expressions are both valid, determine that the selected computing node satisfies the allocation condition of the selected stream processing unit; and if one relational expression is invalid, determine that the selected computing node does not satisfy the allocation condition of the selected stream processing unit;

where the Cmax_usage is a preset upper CPU usage rate limit, the Max_usage is a preset upper memory usage rate limit, the Cused is a CPU resource used by a stream processing unit that is allocated to the selected computing node, Ncpu is the number of CPUs of the selected computing node, Ccore is a CPU frequency of the selected computing node, Mused is a memory resource used by the stream processing unit that is allocated to the selected computing node, and Mpc is the total amount of memory of the selected computing node.

Preferably, the selecting unit 8051 is configured to: if a stream processing unit connected to a data source exists in the stream processing units to be allocated, select from stream processing units to be allocated that are connected to the data source, one stream processing unit as the stream processing unit selected for the selected computing node.

Optionally, the selecting unit 8051 is configured to: if no stream processing unit connected to a data source exists in the stream processing units to be allocated, select, from a stream processing unit to be allocated that is connected to a stream processing unit that is selected last time, one stream processing unit as the stream processing unit selected for the selected computing node.

In conclusion, the apparatus provided by this embodiment of the present invention determines the number of stream processing units included in any one stream processing component according to a parallelism degree of the any one stream processing component, generates at least one stream processing unit to be allocated corresponding to stream processing components, and allocates each stream processing unit to be allocated to a corresponding computing node according to a processing capability of a computing node on which each stream processing component is located and a resource usage rate of each stream processing unit to be allocated, so that the processing capability of the computing node on which each stream processing component is located satisfies a resource usage rate of a stream processing unit allocated to the computing node, thereby improving the steam data processing efficiency of a distributed stream processing system.

Embodiment 4

This embodiment provides a device for allocating a stream processing unit, where the device includes a processor.

The processor is configured to obtain a parallelism degree and a resource usage rate of each stream processing component on each computing node, where the parallelism degree is used to indicate the number of stream processing units included in a stream processing component; determine the number of stream processing units included in any one stream processing component according to a parallelism degree of the any one stream processing component of stream processing components; generate at least one stream processing unit to be allocated corresponding to the stream processing components, and determine a resource usage rate of any one stream processing component as a resource usage rate of any one stream processing unit corresponding to the any one stream processing component; and allocate, according to a processing capability of a computing node on which each stream processing component is located and a resource usage rate of each stream processing unit to be allocated, each stream processing unit to be allocated to a corresponding computing node.

Further, the processor is configured to: for any one stream processing component on any one computing node, test an initial output rate and a maximum output rate of the any one stream processing component by using a stream testing component, and record a resource usage rate corresponding to the any one stream processing component when the any one stream processing component is at the initial output rate and a resource usage rate corresponding to the any one stream processing component at the maximum output rate; and determine a ratio of the maximum output rate to the initial output rate of the any one stream processing component as a parallelism degree of the any one stream processing component, and determine a resource usage rate of the any one stream processing component according to the parallelism degree of the any one stream processing component.

Further, the processor is configured to roundup the parallelism degree of the any one stream processing component to obtain an up-rounded value, and use the up-rounded value as the number of stream processing units included in the any one stream processing component.

Further, the processor is configured to select one computing node from computing nodes on which the stream processing components are located; for the selected computing node, select one stream processing unit for the selected computing node from stream processing units to be allocated; determine, according to a processing capability of the selected computing node and a resource usage rate of the selected stream processing unit, whether the selected computing node satisfies an allocation condition of the selected stream processing unit; and if the allocation condition is satisfied, allocate the selected stream processing unit to the selected computing node.

Further, the processor is configured to determine central processing unit CPU average usage rates Cavg_usage and memory average usage rates Mavg_usage of all stream processing components according to the resource usage rate of each stream processing component on each computing node; and select one computing node from the computing nodes on which the stream processing components are located and determine whether Cused≥Cavg_usage*Ncpu*Ccore or Mused≥Mavg_usage*Mpc is valid, and if valid, use the selected one computing node as the selected computing node; where Cused is a CPU resource used by a stream processing unit that is allocated to the selected one computing node, Ncpu is the number of CPUs of the selected one computing node, Ccore is a CPU frequency of the selected one computing node, Mused is a memory resource used by the stream processing unit that is allocated to the selected one computing node, and Mpc is the total amount of memory of the selected one computing node.

Further, the processor is configured to determine a required CPU resource Cunit and a required memory resource Munit of the selected stream processing unit according to the resource usage rate of the selected stream processing unit; and determine whether Cunit+Cused<Cmax_usage*Ncpu*Ccore is valid; if valid, determine whether Munit+Mused<Max_usage*Mpc is valid; if the two relational expressions are both valid, determine that the selected computing node satisfies the allocation condition of the selected stream processing unit; and if one relational expression is invalid, determine that the selected computing node does not satisfy the allocation condition of the selected stream processing unit; where Cmax_usage is a preset upper CPU usage rate limit, Max_usage is a preset upper memory usage rate limit, Cused is a CPU resource used by a stream processing unit that is allocated to the selected computing node, Ncpu is the number of CPUs of the selected computing node, Ccore is a CPU frequency of the selected computing node, Mused is a memory resource used by the stream processing unit that is allocated to the selected computing node, and Mpc is the total amount of memory of the selected computing node.

Further, the processor is configured to: if a stream processing unit connected to a data source exists in the stream processing units to be allocated, select, from stream processing units to be allocated that are connected to the data source, one stream processing unit as the stream processing unit selected for the selected computing node.

Optionally, the processor is configured to: if no stream processing unit connected to a data source exists in the stream processing units to be allocated, select, from a stream processing unit to be allocated that is connected to a stream processing unit that is selected last time, one stream processing unit as the stream processing unit selected for the selected computing node.

In conclusion, the device provided by this embodiment determines the number of stream processing units included in any one stream processing component according to a parallelism degree of the any one stream processing component, generates at least one stream processing unit to be allocated corresponding to stream processing components, and allocates each stream processing unit to be allocated to a corresponding computing node according to a processing capability of a computing node on which each stream processing component is located and a resource usage rate of each stream processing unit to be allocated, so that the processing capability of the computing node on which each stream processing component is located satisfies a resource usage rate of a stream processing unit allocated to the computing node, thereby improving the steam data processing efficiency of a distributed stream processing system.

It should be noted that when the apparatus and device for allocating a stream processing unit provided by the foregoing embodiments implement stream processing unit allocation, the foregoing division of function modules is used merely as an example for description; in an actual application, the foregoing functions may be allocated to different function modules to complete according to requirements, that is, internal structures of the apparatus and device are divided into different function modules for completing all or a part of the foregoing functions. In addition, the apparatus and device for allocating a stream processing unit provided by the foregoing embodiments pertain to the same concept as the embodiments of the method for allocating a stream processing unit; reference may be made to the method embodiments for specific implementation thereof, and details are not described repeatedly herein.

The serial numbers of the foregoing embodiments of the present invention are used merely for description, and do not represent superiority or inferiority of the embodiments.

A person of ordinary skill in the art may understand that all or a part of the steps of the embodiments may be implemented by hardware or a program instructing relevant hardware. The program may be stored in a computer readable storage medium. The storage medium may include: a read-only memory, a magnetic disk, or an optical disc.

The foregoing descriptions are merely exemplary embodiments of the present invention, but are not intended to limit the present invention. Any modifications, equivalent replacements, or improvements made within the spirit and principle of the present invention shall fall within the protection scope of the present invention.

What is claimed is:

1. A method for allocating a stream processing unit performed by a processor of a device, wherein the method comprises:
    obtaining a parallelism degree and a first resource usage rate of each of a plurality of stream processing components on each of a plurality of computing nodes, wherein the parallelism degree is used to indicate a number of stream processing units comprised in a stream processing component, by:
    for any one stream processing component on any one computing node, testing an initial output rate and a maximum output rate of the any one stream processing component by using a stream testing component, and recording the first resource usage rate corresponding to the any one stream processing component when the any one stream processing component is at the initial output rate and a resource usage rate corresponding to the any one stream processing component at the maximum output rate; and
    determining a ratio of the maximum output rate to the initial output rate of the any one stream processing component as the parallelism degree of the any one stream processing component, and determining the first resource usage rate of the any one stream processing component according to the parallelism degree of the any one stream processing component;
    determining a number of stream processing units comprised in a first stream processing component of the stream processing components according to the parallelism degree of the first processing component;
    generating at least one stream processing unit to be allocated corresponding to the stream processing components, and determining a second resource usage rate of a selected stream processing component as a resource usage rate of any one stream processing unit corresponding to the selected stream processing component;
    allocating each generated stream processing unit to a corresponding computing node according to a processing capability of a computing node on which each stream processing component is located and a resource usage rate of each generated stream processing unit; and
    thereafter processing stream data by each computing node using the corresponding allocated stream processing units.

2. The method according to claim 1, wherein determining the number of stream processing units comprised in the first stream processing component according to the parallelism degree of the first stream processing component comprises:
    rounding up the parallelism degree of the first stream processing component to obtain a whole number up-rounded value, and using the up-rounded value as the number of stream processing units comprised in the first stream processing component.

3. The method according to claim 1, wherein allocating each generated stream processing unit to a corresponding computing node comprises:
    selecting one computing node from computing nodes on which the stream processing components are located;
    selecting one stream processing unit for the selected computing node from stream processing units to be allocated;

determining, according to a processing capability of the selected computing node and a resource usage rate of the selected stream processing unit, whether the selected computing node satisfies an allocation condition of the selected stream processing unit; and when the allocation condition is satisfied, allocating the selected stream processing unit to the selected computing node.

4. The method according to claim 3, wherein selecting one computing node from computing nodes on which the stream processing components are located comprises:

determining central processing unit CPU average usage rates Cavg_usage and memory average usage rates Mavg_usage of all stream processing components according to the resource usage rate of each stream processing component on each computing node; and selecting one computing node from the computing nodes on which the stream processing components are located and determining whether Cused≥Cavg_usage*Ncpu*Ccore or Mused≥Mavg_usage*Mpc is valid, and if invalid, using the selected one computing node as the selected computing node;

wherein Cused is the amount of CPU resource used by a stream processing unit that is allocated to the selected one computing node, Ncpu is the number of CPUs of the selected one computing node, Ccore is a CPU frequency of the selected one computing node, Mused is the amount of memory resource used by the stream processing unit that is allocated to the selected one computing node, and Mpc is the total amount of memory of the selected one computing node.

5. The method according to claim 3, wherein determining, according to the processing capability of the selected computing node and the resource usage rate of the selected stream processing unit, whether the selected computing node satisfies the allocation condition of the selected stream processing unit comprises:

determining a required amount of CPU resource Cunit and a required amount of memory resource Munit of the selected stream processing unit according to the resource usage rate of the selected stream processing unit; and determining whether Cunit+Cused<Cmax_usage*Ncpu*Ccore is valid; if it is valid, determining whether Munit+Mused<Max_usage*Mpc is valid; if the two relational expressions are both valid, determining that the selected computing node satisfies the allocation condition of the selected stream processing unit; and if one relational expression is invalid, determining that the selected computing node does not satisfy the allocation condition of the selected stream processing unit;

wherein Cmax_usage is a preset upper CPU usage rate limit, the Max_usage is a preset upper memory usage rate limit, the Cused is a CPU resource used by a stream processing unit that is allocated to the selected computing node, Ncpu is the number of CPUs of the selected computing node, Ccore is a CPU frequency of the selected computing node, Mused is a memory resource used by the stream processing unit that is allocated to the selected computing node, and Mpc is the total amount of memory of the selected computing node.

6. The method according to claim 3, wherein selecting one stream processing unit for the selected computing node from stream processing units to be allocated comprises:

if a stream processing unit connected to a data source exists in the stream processing units to be allocated, selecting, from stream processing units to be allocated that are connected to the data source, one stream processing unit as the stream processing unit selected for the selected computing node.

7. The method according to claim 3, wherein selecting one stream processing unit for the selected computing node from stream processing units to be allocated comprises:

if no stream processing unit connected to a data source exists in the stream processing units to be allocated, selecting, from stream processing units to be allocated that are connected to a most-recently-selected stream processing unit, one stream processing unit as the stream processing unit selected for the selected computing node.

8. An apparatus for allocating a stream processing unit, wherein the apparatus comprises:

an obtaining module, configured to obtain a parallelism degree and a first resource usage rate of each of a plurality of stream processing components on each of a plurality of computing nodes, wherein the parallelism degree is used to indicate a number of stream processing units comprised in a stream processing component;

a first determining module, configured to determine a number of stream processing units comprised in a first stream processing component according to a parallelism degree of the first stream processing component;

a generating module, configured to generate at least one stream processing unit to be allocated corresponding to stream processing components;

a second determining module, configured to determine a second resource usage rate of a selected stream processing component as a resource usage rate of any one stream processing unit corresponding to the selected stream processing component;

an allocating module, configured to: according to a processing capability of a computing node on which each stream processing component is located and a resource usage rate of each generated stream processing unit, allocate each generated stream processing unit to a corresponding computing node;

a testing unit, configured to: for any one stream processing component on any one computing node, test an initial output rate and a maximum output rate of the any one stream processing component by using a stream testing component;

a recording unit, configured to record a resource usage rate corresponding to the any one stream processing component when the any one stream processing component is at the initial output rate and a resource usage rate corresponding to the any one stream processing component at the maximum output rate;

a first determining unit, configured to determine a ratio of the maximum output rate to the initial output rate, which are recorded by the recording unit, of the any one stream processing component as the parallelism degree of the any one stream processing component;

a second determining unit, configured to determine the first resource usage rate of the any one stream processing component according to the parallelism degree, which is determined by the first determining unit, of the any one stream processing component; and wherein the stream data is thereafter processed by each computing node using the corresponding allocated stream processing units.

9. The apparatus according to claim 8, wherein the first determining module is configured to round up the parallelism degree of the first stream processing component to obtain a whole number up-rounded value, and use the up-rounded value as the number of stream processing units comprised in the first stream processing component.

10. The apparatus according to claim 8, wherein the allocating module comprises:
- a first selecting unit, configured to select one computing node from computing nodes on which the stream processing components are located;
- a second selecting unit, configured to: for the selected computing node, select one stream processing unit for the selected computing node from stream processing units to be allocated;
- a determining unit, configured to: according to a processing capability of the computing node selected by the first selecting unit and a resource usage rate of a stream processing unit selected by the second selecting unit, determine whether the selected computing node satisfies an allocation condition of the selected stream processing unit; and
- an allocating unit, configured to: when the determining unit determines that the allocation condition is satisfied, allocate the selected stream processing unit to the selected computing node.

11. The apparatus according to claim 10, wherein the first selecting unit is configured to determine central processing unit CPU average usage rates Cavg_usage and memory average usage rates Mavg_usage of all stream processing components according to the resource usage rate of each stream processing component on each computing node; and select one computing node from the computing nodes on which the stream processing components are located and determine whether Cused≥Cavg_usage*Ncpu*Ccore or Mused≥Mavg_usage*Mpc is valid, and if invalid, use the selected one computing node as the selected computing node;
- wherein the Cused is a CPU resource used by a stream processing unit that is allocated to the selected one computing node, Ncpu is the number of CPUs of the selected one computing node, Ccore is a CPU frequency of the selected one computing node, Mused is a memory resource used by the stream processing unit that is allocated to the selected one computing node, and Mpc is the total amount of memory of the selected one computing node.

12. The apparatus according to claim 10, wherein the determining unit is configured to determine a required CPU resource Cunit and a required memory resource Munit of the selected stream processing unit according to a resource usage rate of the selected stream processing unit; and determine whether Cunit+Cused<Cmax_usage*Ncpu*Ccore is valid; if it is valid, determine whether Munit+Mused<Max_usage*Mpc is valid; if the two relational expressions are both valid, determine that the selected computing node satisfies the allocation condition of the selected stream processing unit; and if one relational expression is invalid, determine that the selected computing node does not satisfy the allocation condition of the selected stream processing unit;
- wherein the $Cmax_{13}$ usage is a preset upper CPU usage rate limit, the Max_usage is a preset upper memory usage rate limit, the Cused is a CPU resource used by a stream processing unit that is allocated to the selected computing node, Ncpu is the number of CPUs of the selected computing node, Ccore is a CPU frequency of the selected computing node, Mused is a memory resource used by the stream processing unit that is allocated to the selected computing node, and Mpc is the total amount of memory of the selected computing node.

13. The apparatus according to claim 10, wherein the second selecting unit is configured to:
- if a stream processing unit connected to a data source exists in the stream processing units to be allocated, select, from stream processing units to be allocated that are connected to the data source, one stream processing unit as the stream processing unit selected for the selected computing node.

14. The apparatus according to claim 10, wherein the selecting unit is configured to: if no stream processing unit connected to a data source exists in the stream processing units to be allocated, select, from stream processing units to be allocated that are connected to a most-recently-selected stream processing unit, one stream processing unit as the stream processing unit selected for the selected computing node.

* * * * *